(12) United States Patent
Kim et al.

(10) Patent No.: US 7,437,151 B2
(45) Date of Patent: Oct. 14, 2008

(54) REMOTE CONTROL INSTRUCTIONS GENERATING SYSTEM AND REMOTE CONTROL INSTRUCTIONS PROCESSING SYSTEM USING BLUETOOTH, AND PROCESSING METHOD THEREOF

(75) Inventors: Myunggyu Kim, Taejon (KR); Jiyeon Son, Taejon (KR); Jun Seok Park, Taejon (KR); Dong Won Han, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1055 days.

(21) Appl. No.: 10/797,138

(22) Filed: Mar. 11, 2004

(65) Prior Publication Data

US 2005/0136838 A1 Jun. 23, 2005

(30) Foreign Application Priority Data

Dec. 18, 2003 (KR) .................. 10-2003-0093380

(51) Int. Cl.
*H04M 3/00* (2006.01)
(52) U.S. Cl. .................. 455/420; 455/41.2; 455/41.3
(58) Field of Classification Search ............... 455/41.2, 455/41.3, 420; 340/825, 825.2, 5.1
See application file for complete search history.

(56) References Cited

U.S. PATENT DOCUMENTS

| | | | | |
|---|---|---|---|---|
| 5,963,624 | A * | 10/1999 | Pope | 379/110.01 |
| 7,010,268 | B2 * | 3/2006 | Chen | 455/41.2 |
| 7,027,881 | B2 * | 4/2006 | Yumoto et al. | 700/65 |
| 7,085,566 | B1 * | 8/2006 | Burchard et al. | 455/434 |
| 7,139,559 | B2 * | 11/2006 | Kenagy et al. | 455/418 |
| 7,149,475 | B2 * | 12/2006 | Kawamura | 455/41.2 |
| 7,330,719 | B2 * | 2/2008 | Foucher | 455/420 |
| 2002/0045442 | A1 * | 4/2002 | Silen et al. | 455/420 |
| 2003/0073432 | A1 * | 4/2003 | Meade, II | 455/420 |
| 2003/0080874 | A1 * | 5/2003 | Yumoto et al. | 340/825.71 |
| 2004/0077313 | A1 * | 4/2004 | Oba et al. | 455/41.2 |
| 2004/0110504 | A1 * | 6/2004 | Kenagy et al. | 455/436 |
| 2004/0203697 | A1 * | 10/2004 | Finn | 455/420 |
| 2004/0203950 | A1 * | 10/2004 | Chen | 455/466 |
| 2004/0257209 | A1 * | 12/2004 | Yang | 340/426.13 |

FOREIGN PATENT DOCUMENTS

| | | |
|---|---|---|
| JP | 2002-149512 | 5/2002 |
| KR | 20-0241180 | 7/2001 |
| KR | 20-0249694 | 9/2001 |
| KR | 2002-24011 | 3/2002 |

* cited by examiner

*Primary Examiner*—Lewis G West
(74) *Attorney, Agent, or Firm*—Lowe Hauptman Ham & Berner, LLP

(57) ABSTRACT

Disclosed is a remote control instructions generating system which is installed at a portable phone having Bluetooth communication function to perform a remote controlling function of a computer, the system including: a detection value inputting unit for receiving a detection value that a user inputs using a keypad of the portable phone; a detection value storing unit for storing the detection value inputted through the detection value inputting unit and information on a time at which the detection value is inputted; and a detection value query processing module for transmitting the detection value and its corresponding time information stored in the detection value storing unit to the computer in case that the computer queries a detection value through Bluetooth communication.

7 Claims, 3 Drawing Sheets

FIG. 3

| DETECTION VALUE | INTERPRETATION VALUE | INSTRUCTION |
|---|---|---|
| @@@ | None | REMOTE CONTROL INSTRUCTIONS PROCESSING SYSTEM IS ENDED |
| @@ | Alt-F4 | ENDING PROGRAM |
| /1 | Ctrl-Alt-1 | EXECUTING WEB BROWSER |
| /2 | Ctrl-Alt-2 | EXECUTING FILE SEARCHER |
| /3 | Ctrl-Alt-3 | EXECUTING MEMO SHEET |
| /4 | Ctrl-Alt-4 | EXECUTING MOBILE IMAGE |
| /7 | PageUp | EXECUTING PAGE-UP |
| /8 | PageDown | EXECUTING PAGE-DOWN |

REMOTE CONTROL INSTRUCTIONS GENERATING SYSTEM AND REMOTE CONTROL INSTRUCTIONS PROCESSING SYSTEM USING BLUETOOTH, AND PROCESSING METHOD THEREOF

BACKGROUND OF THE INVENTION

1. Field of the Invention

The present invention relates to a remote control instructions generating system and a remote control instructions processing system using Bluetooth, and a processing method thereof, and more particularly, to a remote control instructions generating system and a remote control instructions processing system which are respectively installed at a portable phone and a computer so as to allow the portable phone having Bluetooth to be used as a remote controller of the computer, and a processing method in the remote control instructions processing system. The present invention duplicately relates with the Bluetooth application technology field and a wireless control system technology field.

2. Description of the Related Art

After a quickening at the end of 20th century, Bluetooth technology is variously applied to a mobile terminal, a personal computer, a peripheral device, an information electric home appliance and the like. The Bluetooth technology has been most remarkably applied to the portable phone being a most interested field among the above application fields. At present, it is applied to a wireless headset, a dial-up networking and the like. In addition to the above standardized Bluetooth application, the Bluetooth portable phone remote controlling method proposed in the present invention has an advantage in that even without addition of a new hardware or software to the Bluetooth portable phone, and even without modification of a conventional hardware or software constructing the portable phone, the computer can be remotely controlled using the portable phone only by operating the remote control instructions processing system of the computer.

Bluetooth is based on a lower hierarchy technology and a higher hierarchy technology. The lower hierarchy technology is a technology related with hardware of a wireless device, a base band, a link manager and the like, and firmware operating in the hardware. The higher hierarchy technology is a technology field of protocol and application software operating in a computer, a portable digital assistant (PDA), the portable phone and the like. As Bluetooth technology related with the portable phone, there are a file transmission profile, a headset profile and a dial-up networking profile standardized in Bluetooth SIG (Special Interest Group).

The Bluetooth file transmission profile is a technology for transmitting personal information stored in the portable phone, a picture taken by camera, a character or picture received in a short message and the like through a remote computer or printer by wireless. Its target computer or printer should also support the Bluetooth file transmission profile. Currently, the Bluetooth portable phone having the file transmission profile is just only of small minority.

The Bluetooth headset profile is a technology in which a wireless headset is substituted for a wire earphone used together with the portable phone. This allows a user to use only Bluetooth headset to answer or call a phone and to control a volume with the Bluetooth portable phone being held in a pocket or a bag. The Bluetooth portable phone all supports headset profiles.

All portable phones are connected with the computer through a serial cable to transmit an AT command to the computer and at the same time, to receive an AT event such that the portable phone can be used like a wireless modem. As described above, a technology in which a wire serial cable is substituted with the wireless Bluetooth in a method of using the portable phone like the modem through the wire serial cable is Bluetooth dial-up networking profile. If connection is made to a Point-to-Point Protocol (PPP) server connected to internet by using the AT command, the computer can be connected to internet.

Recently, as a mobile communication subscriber explosively increases in number, most of people currently use the portable phone. The portable phone is not limited to a voice phone service in its use, and tends to include functions of internet connection, a digital camera, a MP3 player and the like. Recently, on the market is also the portable phone having an integrated remote control function for controlling indoor electric home appliances using infrared ray by complex of such a digital technology.

The portable phone having the integrated remote control function is based on an Infra Red Control (IRC) technology using the infrared ray. However, some notebook models employ an Infra Red Data Association (IRDA) technology, but most of computers do not employ the IRC technology. Therefore, it is difficult to control the computer by the portable phone having the integrated remote control function. Further, even in case the IRC technology is applied to control the computer by the portable phone, there are many limitations in using the portable phone as a remote controller of the computer due to straightness and impermeability to obstacles being a property of the infrared ray.

Recently, the Bluetooth portable phone pours in on the market, and the Bluetooth tends to be gradually increasingly used in the computer. Additionally, the Bluetooth is not limited to the straightness and the impermeability to the obstacles. Accordingly, it is very useful to use the Bluetooth to control the computer by the portable phone. The present invention relates to a technology in which the Bluetooth portable phone can be used as the remote controller of the computer, and relates to a technology in which a conventional Bluetooth portable phone does not require a new program and technology, and the Bluetooth computer just only includes the instructions processing system to be remotely controlled by the portable phone.

SUMMARY OF THE INVENTION

Accordingly, the present invention is directed to a remote control instructions generating system and a remote control instructions processing system using Bluetooth, and a processing method thereof that substantially obviate one or more problems due to limitations and disadvantages of the related art.

An object of the present invention is to provide a remote control instructions generating system and a remote control instructions processing system which are respectively installed at a portable phone and a computer so as to allow the portable phone having Bluetooth to be used as a remote controller of the computer, and a processing method in the remote control instructions processing system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a remote control instructions generating system which is installed at a portable phone having Bluetooth communication function to perform a remote controlling function of a computer, the system including: a detection value inputting unit for receiving a detection value that a user inputs using a keypad of the portable phone; a detection value storing unit for storing the detection value inputted through the detection value inputting unit and information on a time at which the detection value is inputted; and a detection value query processing module for transmitting the detection value and its corresponding time information stored in the detection value storing unit to the computer in case that the computer queries a detection value through Bluetooth communication.

In another aspect of the present invention, there is provided a remote control instructions processing system which is installed at a computer having Bluetooth communication function to process a remote control instruction signal received from the portable phone, the system including: a user definition table storing unit for storing a user definition table having a detection value and its corresponding interpretation value which are constructed in a sequence pair; a user definition table loading unit for loading the user definition table from the user definition table storing unit to store it in an internal memory; and a module using a polling method for transmitting a message of querying the detection value of the portable phone that a user inputs and correspondingly receiving a message having the detection value transmitted from the portable phone through Bluetooth communication; an instruction analyzing module for analyzing the received message to separate the detection value and time information; an instruction interpreting module for comparing the separated time information with earlier obtained time information, and in case that the separated time information is different from the earlier time information, retrieving whether or not there is the separated detection value in the loaded user definition table; and an interpretation value transmitting module for interpreting the detection value into a character string to transmit it to an operating system in case that there is not the detection value in the user definition table, and transmitting the interpretation value corresponding to the detection value to the operating system in case that there is the detection value in the user definition table.

In a further another aspect of the present invention, there is provided a remote control instructions processing method which is applied to a remote control instructions processing system being installed at a computer having Bluetooth communication function to process a remote control instruction signal from a portable phone, the method including the steps of: (a) receiving a user's selection for a dial-up networking procedure or a remote control instructions processing procedure, and in case that a user selects the remote control instructions processing procedure, loading a user definition table to initially query a detection value and to analyze and record the detection value and time information correspondingly received; (b) again querying the detection value, analyzing a correspondingly received message to record the detection value and its corresponding time information, and determining whether or not the time information of the detection value is modified from the earlier time information; (c) determining whether or not the detection value of the step (b) is an end instruction, and in case of not being the end instruction, determining whether or not there is the detection value in the user definition table; (d) transmitting an interpretation value corresponding to the detection value to an operating system in case that there is the detection value in the user definition table in the step (c), and interpreting the detection value into a character string to transmit it to the operating system in case that there is not the detection value in the user definition table; and (e) repeating each of the steps in a polling method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a view illustrating an example of a user definition table according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In order to use a portable phone as a remote controller of the computer as described above, needed is a method of recognizing a variation of specific information on the portable phone by using Bluetooth wireless communication in a computer. This requires requisites that Bluetooth data communication can be made between the computer and the portable phone. However, a data communication method with the computer employed in most of the Bluetooth portable phones is just only Bluetooth dial-up networking profile. Accordingly, the present invention modifies and uses a dial-up networking profile as a method for controlling the computer using the Bluetooth portable phone. This means that after Bluetooth modem connection, a remote control instructions processing system is operated without performing a function of a dial-up networking system, for example, a function of dialing-up, Point-to-Point Protocol (PPP) negotiation and networking setup on a computer port.

Figure 1:
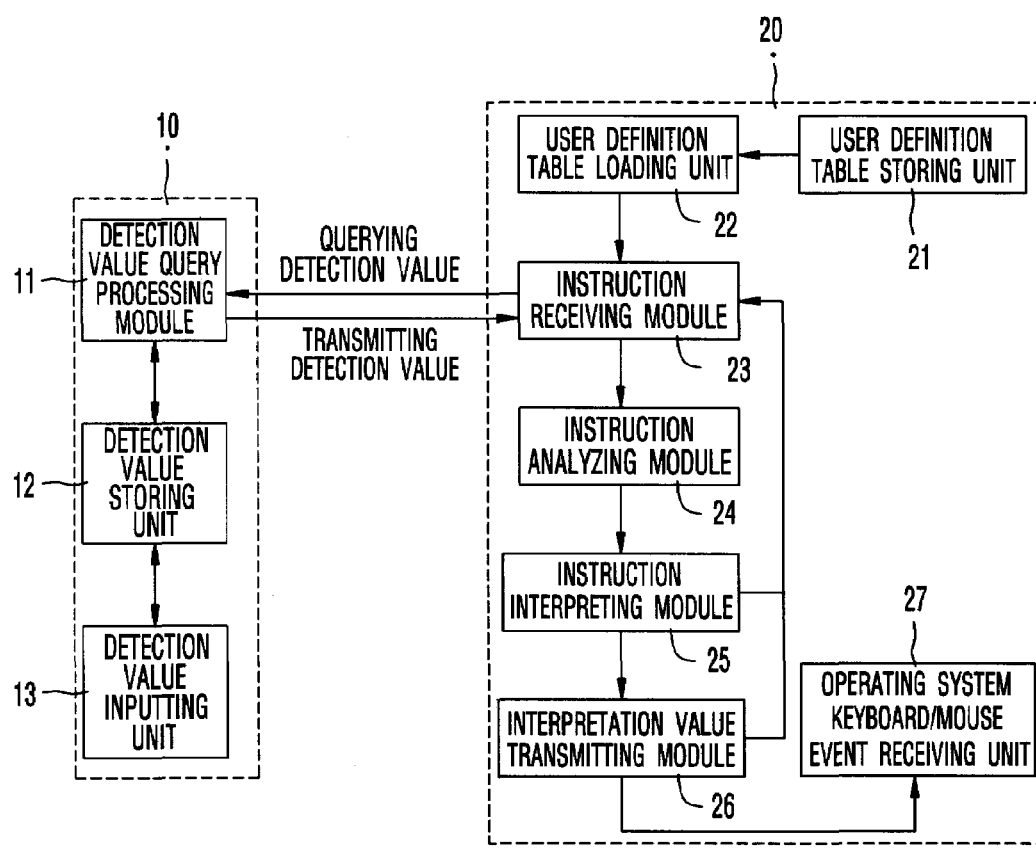
FIG. 1 is a view illustrating a construction of a remote control instructions generating system and a remote control instructions processing system according to a preferred embodiment of the present invention.

FIG. 1 is a view illustrating a construction of a remote control instructions generating system 10 and a remote control instructions processing system 20 according to a preferred embodiment of the present invention.

In FIG. 1, the remote control instructions generating system 10 is installed within the portable phone, and the remote control instructions processing system 20 is installed within the computer. As shown in FIG. 1, the remote control instructions generating system 10 is comprised of a detection value query processing module 11; a detection value storing unit 12; and a detection value inputting unit 13. The remote control instructions processing system 20 is comprised of a user definition table storing unit 21; a user definition table loading unit 22; an instructions receiving module 23; an instructions analyzing module 24, an instructions interpreting module 25, an interpretation value transmitting module 26; and an operating system keyboard/mouse event receiving unit 27.

Referring to FIG. 1, an operation of the remote control instructions generating system 10 will be described.

Firstly, if the detection value query processing module 11 receives a detection value query from the computer, it reads a value of the detection value storing unit 12 to transmit the read value together with time information to the remote control instructions processing system 20 installed within the computer. The detection value inputted through the detection value inputting unit 13 by a portable phone user is stored in the detection value storing unit 12. The user can modify the detection value through the detection value inputting unit 13 corresponding to a kind of a key pad of the portable phone. If the user modifies the detection value, time information of the detection value storing unit 12 is also changed into information on a modified time. In the above remote control instructions generating system 10, the detection value query processing module 11 is a module for receiving an AT command from the computer to transmit an AT event. The detection value storing unit 12 and the detection value inputting unit 13 for user's manual inputting can be exemplified in a case that the user inputs his/her own name to the portable phone.

Next, an operation of the remote control instructions processing system 20 according to a preferred embodiment of the present invention will be described with reference to FIG. 1.

Referring to FIG. 1, the user definition table loading unit 22 loads a user definition table from the user definition table storing unit 21 of an operating system file system to store respective sequence pairs in an internal memory. The user definition table is comprised of a sequence pair of the detection value and its corresponding interpretation value. Next, the instructions receiving module 23 continues to transmit a message of querying the detection value of the portable phone and correspondingly receive a message having the detection value by Bluetooth wireless communication. A procedure for continuous query transmission and reception is performed in a polling method. Since the received message also includes the time information having the modified detection value in addition to the detection value, the instruction analyzing module 24 analyzes the received message to separate the message into the detection value, the time information and other information. The instruction interpreting module 25 refers to newly obtained time information to determine whether it is the same as earlier obtained time information. If the newly obtained time information is the same as the earlier obtained time information, the instruction receiving module 23 is again operated. If the newly obtained time information is different from the earlier time information, the instruction interpreting module 25 retrieves whether there is the detection value in the table obtained from the user definition table loading unit 22. If there is not the detection value in the table, the interpretation value transmitting module 26 interprets the detection value into a character string to transmit it to the operating system keyboard/mouse event receiving unit 40. If there is the detection value in the table, the interpretation value transmitting module 26 transmits the interpretation value corresponding to the detection value to the operation system keyboard/mouse event receiving unit 27. The instruction receiving module 23 for querying and receiving the detection value to the portable phone is a module for transmitting the AT command querying the detection value to the portable phone and correspondingly receiving the AT event.

Next, an operation of the remote control instructions processing system will be described with reference to FIG. 2.

Figure 2:
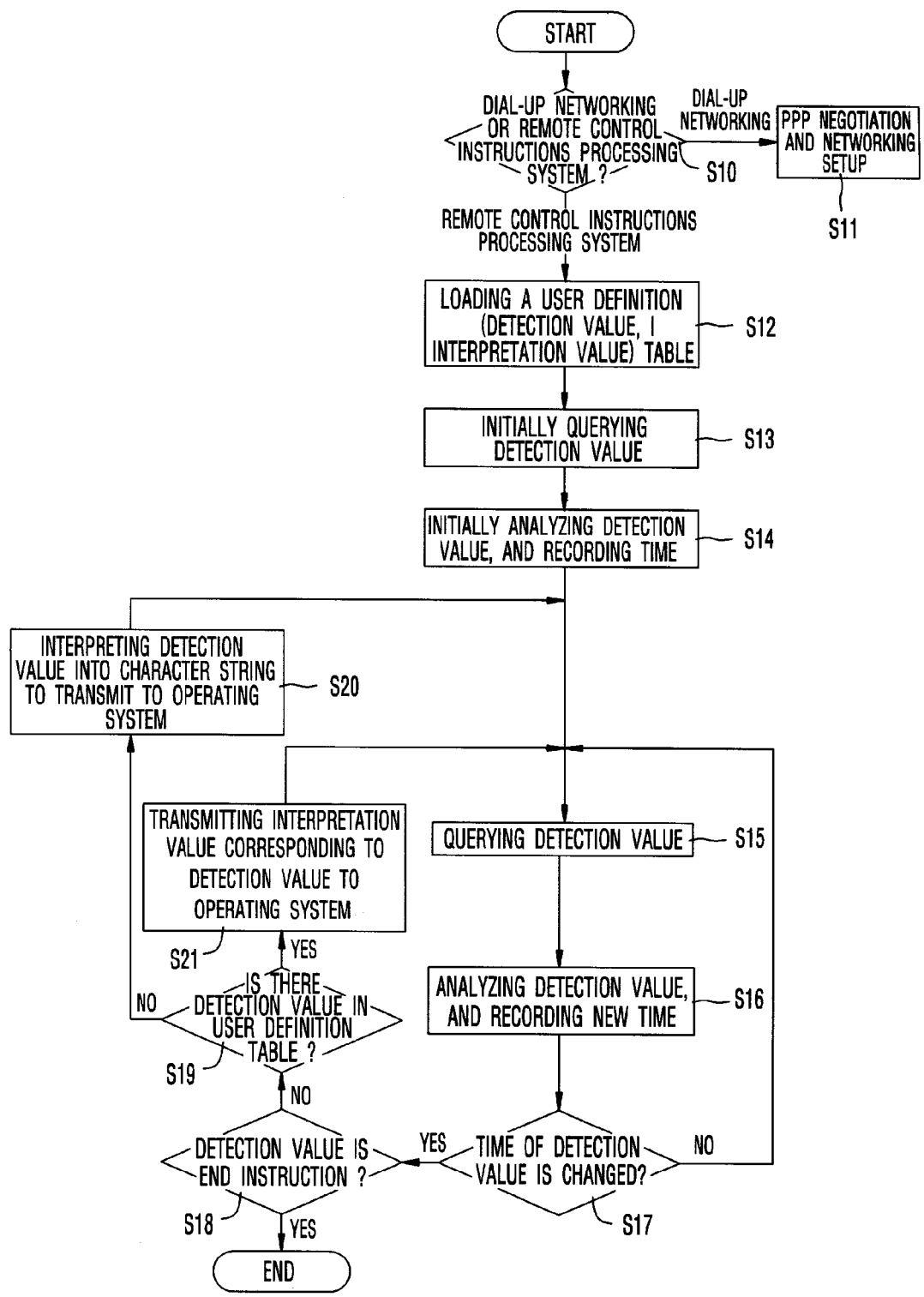
FIG. 2 is a flow chart illustrating a total operation of a remote control instructions processing system according to a preferred embodiment of the present invention.

FIG. 2 is a flow chart illustrating a total operation of the remote control instructions processing system according to a preferred embodiment of the present invention.

As shown in FIG. 2, after Bluetooth connection is made, the user selects in a step (S10) whether to operate the dial-up networking system or to operate the remote control instructions processing system in the computer. If the user selects to operate the dial-up networking system in the step (S10), operations of the dialing-up, the PPP negotiation and the networking setup are performed (S11). If the user selects to operate the remote control instructions processing system in the step (S10), as an initial operation, the user definition table is loaded from the user definition table storing unit 21 of FIG. 1 in the file system of the operating system such that the sequence pairs of the detection value, the interpretation value and the like are stored in the internal memory (S12). Next, the detection value is initially queried to the remote control instructions generating system 10 of the portable phone (S13), and its correspondingly transmitted message from the remote control instructions generating system 10 is initially analyzed such that the time information included in the message is recorded (S14).

Next, the detection value is again queried (S15), and the correspondingly received message is analyzed such that the new time information received together with the detection value is recorded (S16). It is determined whether or not the newly recorded time information in the step (S16) is modified differently from the earlier time information (S17). In case it is determined not being modified, jumping is made to the step (S15) to repeat the detection value querying procedure. If it is determined that the newly recorded time information in the step (S17) is modified differently from the earlier time information, it is determined whether or not the received detection value is an end instruction (S18). If it is determined that the received detection value is the end instruction in the step (S18), the operation of the remote control instructions processing system is ended. If it is determined that the received detection value is not the end instruction in the step (S18), it is retrieved whether or not there is the detection value in the user definition table (Sl9). If there is not the detection value in the user definition table in the step (Sl9), the detection value is interpreted into the character string to be transmitted to the operating system (S20). To the contrary, if there is the detection value in the user definition table in the step (Sl9), the interpretation value corresponding to the detection value is transmitted to the operating system (S21). After the steps (S20 and S21) are performed, irrespective of whether or not there is the detection value in the user definition table, jumping is made to the step (S15) to again perform detection value querying procedure. The above detection value querying method using the controlled computer is the polling method and is distinguished from a pushing method being a unilateral command transmitting method using the portable phone.

FIG. 3 is a view illustrating an example of the user definition table according to the present invention.

As shown in FIG. 3, the user definition table is comprised of the sequence pairs of the detection value and the interpretation value. That is, the detection value means the character string that can be easily inputted through the keypad of the portable phone. It is preferably comprised of "*", "/", "#", "@", "0", to "9", and the like. The interpretation value corresponding to the detection value can be defined by the user irrespective of the detection value, but as shown in FIG. 3, a specific key string is preferably inputted for allowing execution or end of a specific program in the operating system. The detection value not defined in the user definition table can be interpreted into a general character string to be used as the character string inputted to a document editor or an address window of a Web browser.

The processing method of the remote control instructions processing system according to a preferred embodiment of the present invention can be programmed to be stored in a recording medium of a hard disc, a floppy disc, an optical magnetic disc, a CD (Compact Disc) ROM, a ROM, a RAM and the like.

As described above, the present invention allows the portable phone used for the wireless and mobile communication outdoors to be used as the remote controller of the computer indoors in such as a house or an office. Herein, the computer is not limited to the personal computer, and includes various appliances of a personal computer hardware-based Home Theater PC (HTPC), Car Theater PC (CTPC), home server, digital set-top box and the like. Accordingly, the portable phone as the wireless local area appliance also increases in usefulness, and it is easy to control computer appliances providing various services. The present invention allows the remote control function to be enabled in the polling method without modification or addition of the hardware or software in the conventional Bluetooth portable phone such that the remote control technology using the Bluetooth portable phone can be acceleratively popularized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A remote control instructions generating system which is installed at a portable phone having Bluetooth communication function to perfom a remote controlling function of a computer, the system comprising:
    a detection value inputting unit for receiving a detection value that a user inputs using a keypad of the portable phone;
    a detection value storing unit for storing the detection value inputted through the detection value inputting unit and information on a time at which the detection value is inputted; and
    a detection value query processing module for transmitting the detection value and its corresponding time information stored in the detection value storing unit to the computer in case that the computer queries a detection value through Bluetooth communication.

2. A remote control instructions processing system which is installed at a computer having Bluetooth communication function to process a remote control instruction signal received from a portable phone, the system comprising:
    a user definition table storing unit for storing a user definition table having a detection value and its corresponding interpretation value which are constructed in a sequence pair;
    a user definition table loading unit for loading the user definition table from the user definition table storing unit to store it in an internal memory; and
    a module using a polling method for transmitting a message of querying the detection value of the portable phone that a user inputs and conespondingly receiving a message having the detection value transmitted from the portable phone through Bluetooth communication;
    an instruction analyzing module for analyzing the received message to separate the detection value and time information from the message;
    an instruction interpreting module for comparing the separated time information with earlier obtained time information, and in case that the separated time information is different from the earlier time information, retrieving whether or not there is the separated detection value in the loaded user definition table; and
    an interpretation value transmitting module for interpreting the detection value into a character string to transmit it to an operating system in case that there is not the detection value in the user definition table, and transmitting the interpretation value coffesponding to the detection value to the operating system in case that there is the detection value in the user definition table.

3. The remote control instructions processing system of claim 2, wherein the instruction interpreting module again operates the instruction receiving module in case that the separated time information is the same as the earlier time information.

4. The remote control instructions processing system of claim 2, wherein the operating system is an operating system keyboard/mouse event receiving unit.

5. A remote control instructions processing method which is applied to a remote control instructions processing system being installed at a computer having Bluetooth communication function to process a remote control instruction signal from a portable phone, the method comprising the steps of:
    (a) receiving a user's selection for a dial-up networking procedure or a remote control instructions processing procedure, .and in case that a user selects the remote control instructions processing procedure, loading a user definition table to initially query a detection value and to analyze and record the detection value and time information correspondingly received;
    (b) again querying the detection value, analyzing a correspondingly received message to record the detection value and its corresponding time information, and determining whether or not the time information of the detection value is modified from the earlier time information;
    (c) determining whether or not the detection value of the step (b) is an end instruction, and in case of not being the end instruction, determining whether or not there is the detection value in the user definition table;
    (d) transmitting an interpretation value corresponding to the detection value to an operating system in case that there is the detection value in the user definition table in the step (c), and interpreting the detection value into a character string to transmit it to the operating system in case that there is not the detection value in the user definition table; and
    (e) repeating each of the steps in a polling method.

6. The remote control instructions processing method of claim 5, further comprising the step of performing operations of dialing-up, PPP (Point-to-Point Protocol) negotiation and networking setup in case that the user selects the dial-up networking procedure in the step (a).

7. The remote control instructions processing method of claim 5, wherein the user definition table is comprised of a sequence pair of the detection value and its corresponding interpretation value.

* * * * *